(12) United States Patent
Cruson

(10) Patent No.: US 7,617,783 B1
(45) Date of Patent: Nov. 17, 2009

(54) FURROWING TIP BODY FOR A PAIRED ROW OPENER

(75) Inventor: Brian Cruson, Abbottsford (CA)

(73) Assignee: Dutch Blacksmith Shop Ltd., Pilot Butte, CA (US)

( * ) Notice: Subject to any disclaimer, the term of this patent is extended or adjusted under 35 U.S.C. 154(b) by 0 days.

(21) Appl. No.: 12/246,707

(22) Filed: Oct. 7, 2008

(51) Int. Cl.
*A01C 5/00* (2006.01)
*A01C 7/00* (2006.01)
*A01C 9/00* (2006.01)

(52) U.S. Cl. .................. 111/150; 111/152; 111/186

(58) Field of Classification Search ......... 111/118–130, 111/149, 150, 152–156, 170, 186–189
See application file for complete search history.

(56) References Cited

FOREIGN PATENT DOCUMENTS

CA 2432272 A1 * 12/2003

* cited by examiner

*Primary Examiner*—Christopher J. Novosad
(74) *Attorney, Agent, or Firm*—Ade & Company Inc.; Ryan W. Dupuis; Kyle R. Satlerthwaite

(57) ABSTRACT

A paired row opener has a furrowing tip arranged to be selectively supported on a body of the opener. The furrowing tip includes a knife portion and a pair of wing portions extending rearwardly and outwardly therefrom. A central chamber between the wing portions communicates with a primary delivery passage of the opener body to receive the primary particulate material therefrom to be dispensed in a paired row from a pair of outlet openings of the chamber which are laterally spaced apart in a rear face of the tip body. A bottom wall spans a bottom side of the chamber between the wing portions to the rear face such that the outlet openings lie in an upright plane at a rearmost end of the tip body to be prevented from plugging even in wet conditions, while remaining selectively separable with the tip body from the opener body for replacement.

20 Claims, 8 Drawing Sheets

FURROWING TIP BODY FOR A PAIRED ROW OPENER

FIELD OF THE INVENTION

The present invention relates to a paired row opener for opening a furrow and placing a paired row of particular material in the furrow, and more particularly relates to a furrowing tip body arranged to be supported on a body of the opener for ready separation to replace the wearing components thereof.

BACKGROUND

The use of paired row for row openers are known when it is desirable to place two rows of seed and a row of fertiliser parallel to one another trailing a single furrowing element. A typical arrangement of a paired row opener includes a knife to produce a deep narrow furrow and separate wings spaced in the direction of travel and laterally outward in relation to the knife for widening the furrow to position a pair of seeded rows along opposing sides of the furrow.

One example of a paired row furrow opener having a knife and wings is disclosed in Canadian Patent 2,432,272 in which the knife, the wings and a deflector for splitting the seed into a paired row are separable together from a body of the opener which is mounted on the implement shank of a cultivator. A central chamber above the deflector, where the seed is split into the paired rows, is positioned rearwardly of the wing portions so that the central chamber is open to the sides and bottom of the tip body. In some wet conditions, it is possible for mud to enter into the central chamber from the sides and from below the wings so as to cause some plugging of the seed intended to be dispensed in paired rows therefrom.

SUMMARY OF THE INVENTION

According to one aspect of the invention there is provided a furrowing tip body arranged for use in a paired row opener, the paired row opener having an opener body comprising a shank mount arranged to support the opener body on an implement shank for movement therewith in a forward working direction and a primary delivery passage extending through the opener body so as to be arranged to deliver a primary particulate material therethrough, the furrowing tip body comprising:

a tip mount arranged to support the tip body on the opener body of the paired row opener;

a knife portion projecting forwardly from the tip mount to a forward end of the tip body;

a pair of wing portions projecting rearwardly and laterally outwardly from opposing sides of the knife portion;

a central chamber positioned rearwardly of the knife portion between the pair of wing portions and arranged to communicate with the primary delivery passage of the opener body to receive the primary particulate material therefrom;

a bottom wall spanning a bottom side of the central chamber; and a pair of outlet openings at laterally spaced apart positions in a rear face of the tip body, the outlet openings being in communication with the central chamber so as to be arranged to dispense the primary particulate material from the central chamber into a pair of laterally spaced apart rows;

the tip mount being readily separable from the opener body such that the knife portion, the wing portions, the bottom wall and the rear face locating the outlet openings therein are separable from the opener body together with one another.

By positioning the central chamber where material is split into paired rows at a location between the wing portions, the central chamber is substantially enclosed at outer sides thereof by the wing portions, while a bottom wall serves to enclose the bottom side of the central chamber. In this manner, the central opening is only open at the outlet openings in the rear face of the tip body to prevent mud from entering the central chamber from the sides or from below while forming a furrow and thereby prevent plugging of the central chamber even in wet field conditions.

The bottom wall preferably extends between the wing portions to the rear end of the tip body.

A plane of each of the outlet openings in the rear face of the tip body is preferably in a vertical orientation, substantially coplanar with the other outlet opening so as to be perpendicular to the forward working direction.

A top side and outer sides of the central chamber may be arranged to be substantially enclosed by the wing portions which extend rearward to the rear face of the tip body at the rear end of the tip body to respective upright rear edges lying substantially in a plane of the openings in the rear face of the tip body.

The upright rear edges of the wing portions may be near vertical.

The knife portion and the wing portions preferably extend downwardly below the bottom wall which may be substantially horizontal along a bottom side of the tip body.

When each wing portion has a first forward portion having a leading edge extending rearwardly at an outward incline and a second rearward portion having an outer edge extending rearwardly from the leading edge of the first forward portion, the bottom wall of the central chamber preferably spans between the outer edges of the pair of wing portions. The outer edges of the second rearward portions of the wing portions may be substantially parallel to one another and the forward working direction.

Each wing portion may also have a first forward portion having an upper surface extending rearwardly at an upward incline and a second rearward portion having an upper surface extending rearwardly from the upper surface of the first forward portion at an upward incline which is more vertical than the upper surface of the first forward portion. In this instance, the bottom wall of the central chamber preferably spans between the second rearward portions of the pair of wing portions.

The second rearward portions of the wing portions may extend rearwardly to a rearmost end of the tip body.

Each of the outlet openings may have a height which is near a lateral width of the opening.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
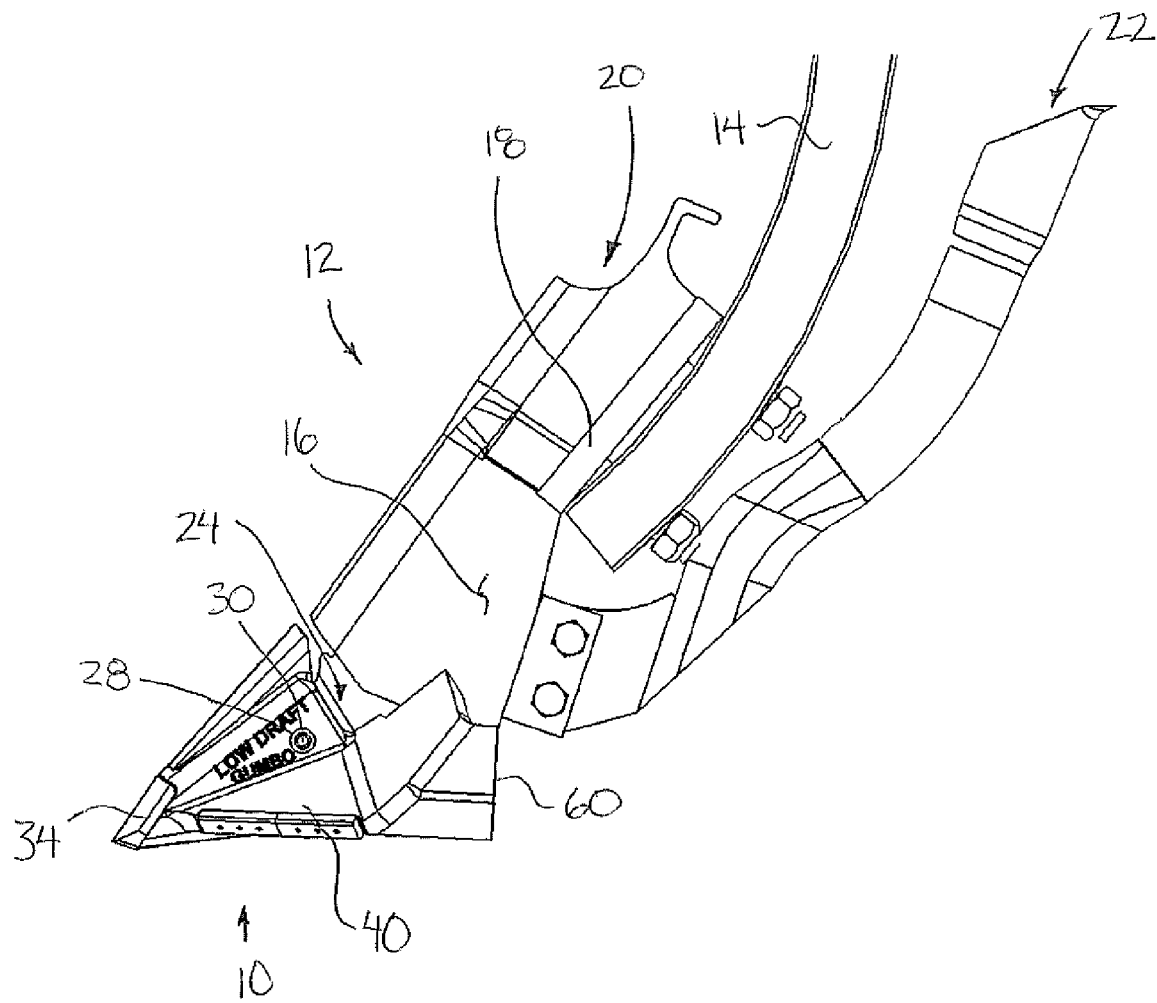
FIG. 1 is a side elevational view of the furrowing tip body supported on an opener body in a paired row opener.
Figure 2:
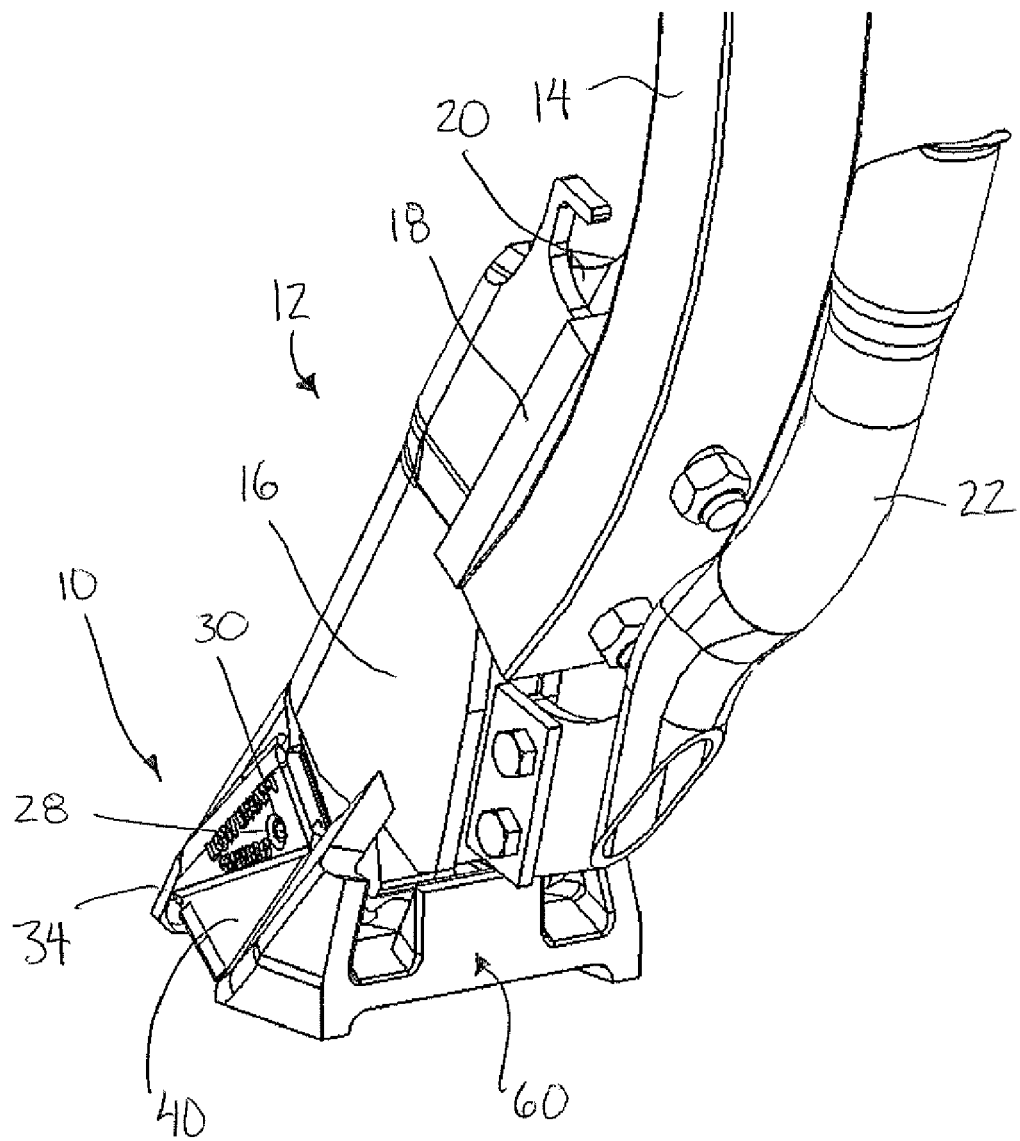
FIG. 2 is a rear perspective view of the furrowing tip body in the paired row opener according to FIG. 1.
Figure 3:
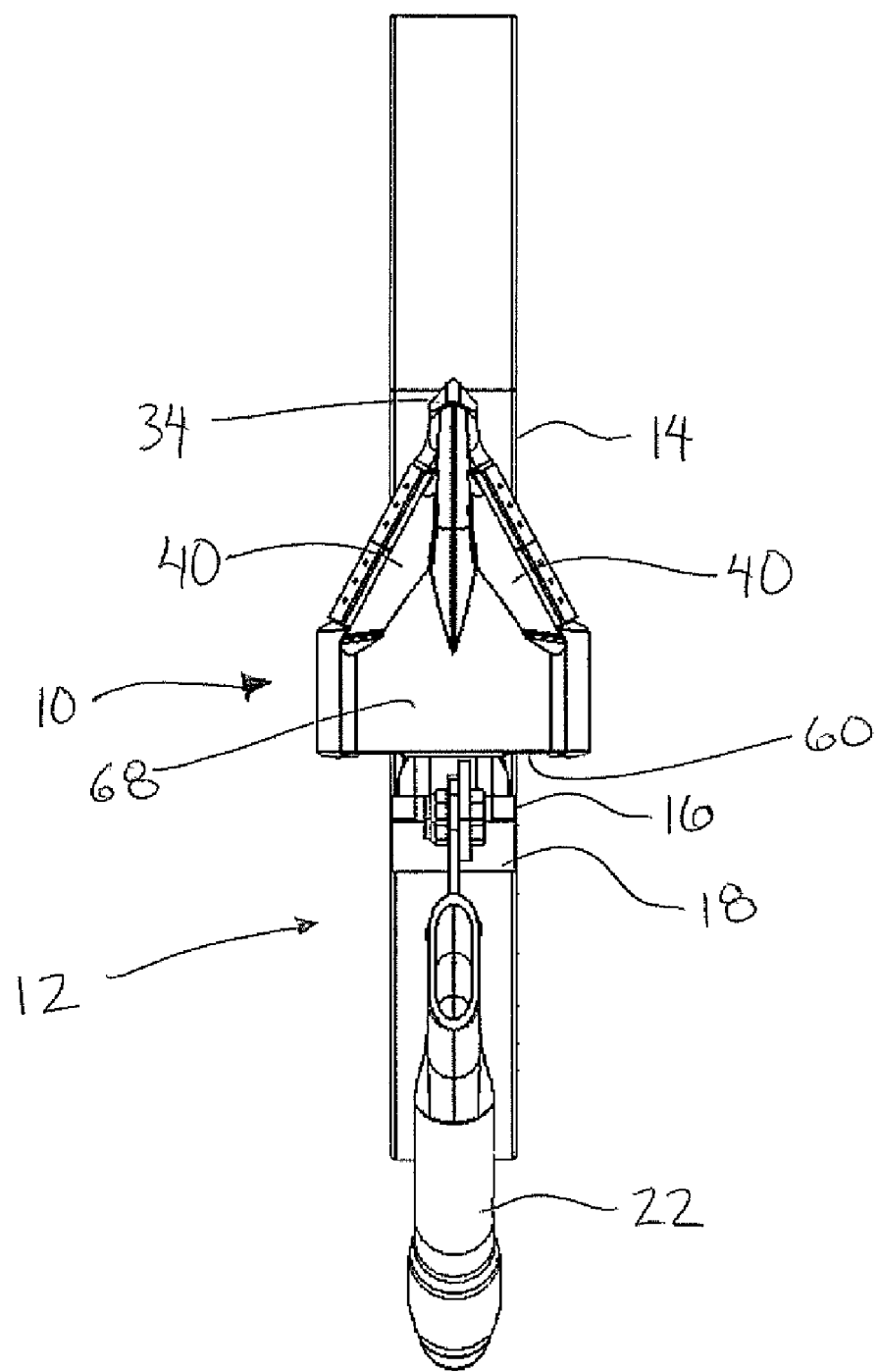
FIG. 3 is a bottom plan view of the furrowing tip body in the paired row opener according to FIG. 1.
Figure 4:
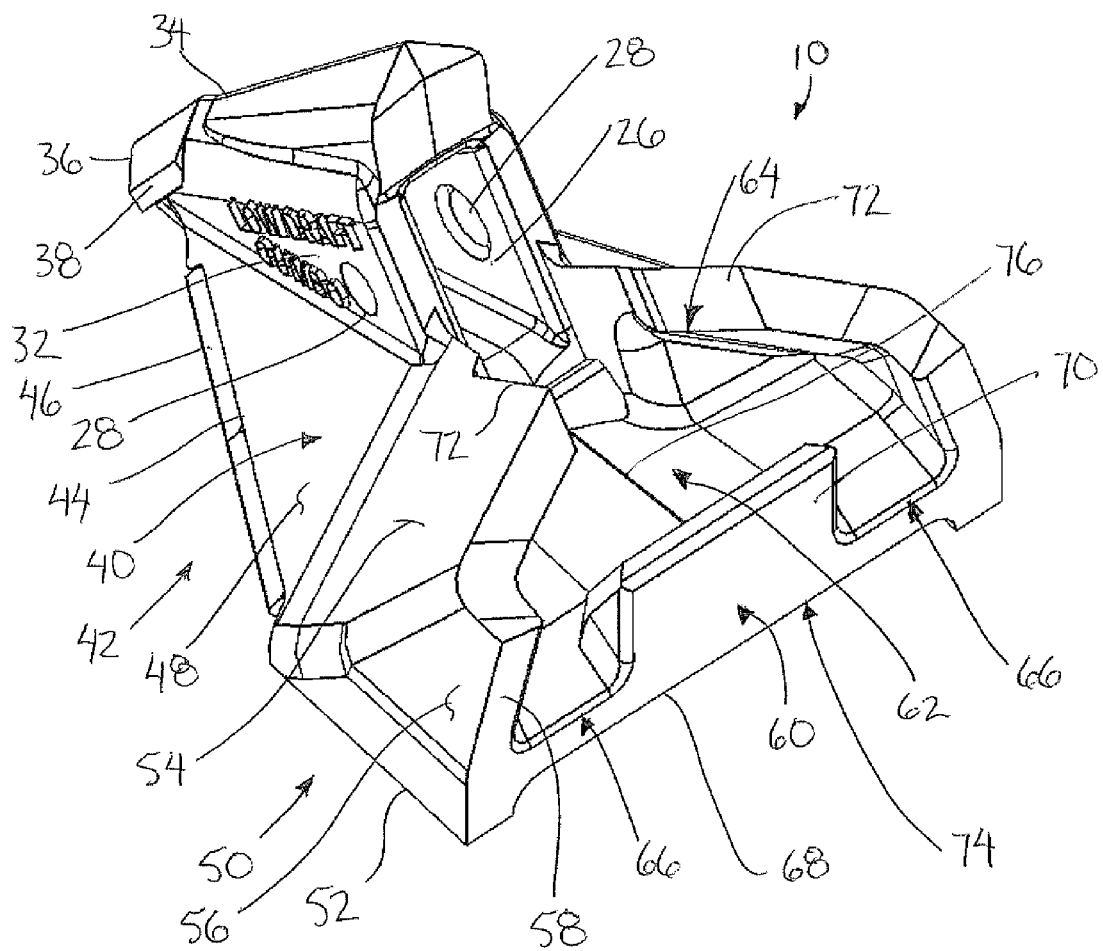
FIG. 4 is a top perspective view of the furrowing tip body of FIG. 1 shown separated from the opener body.
Figure 5:
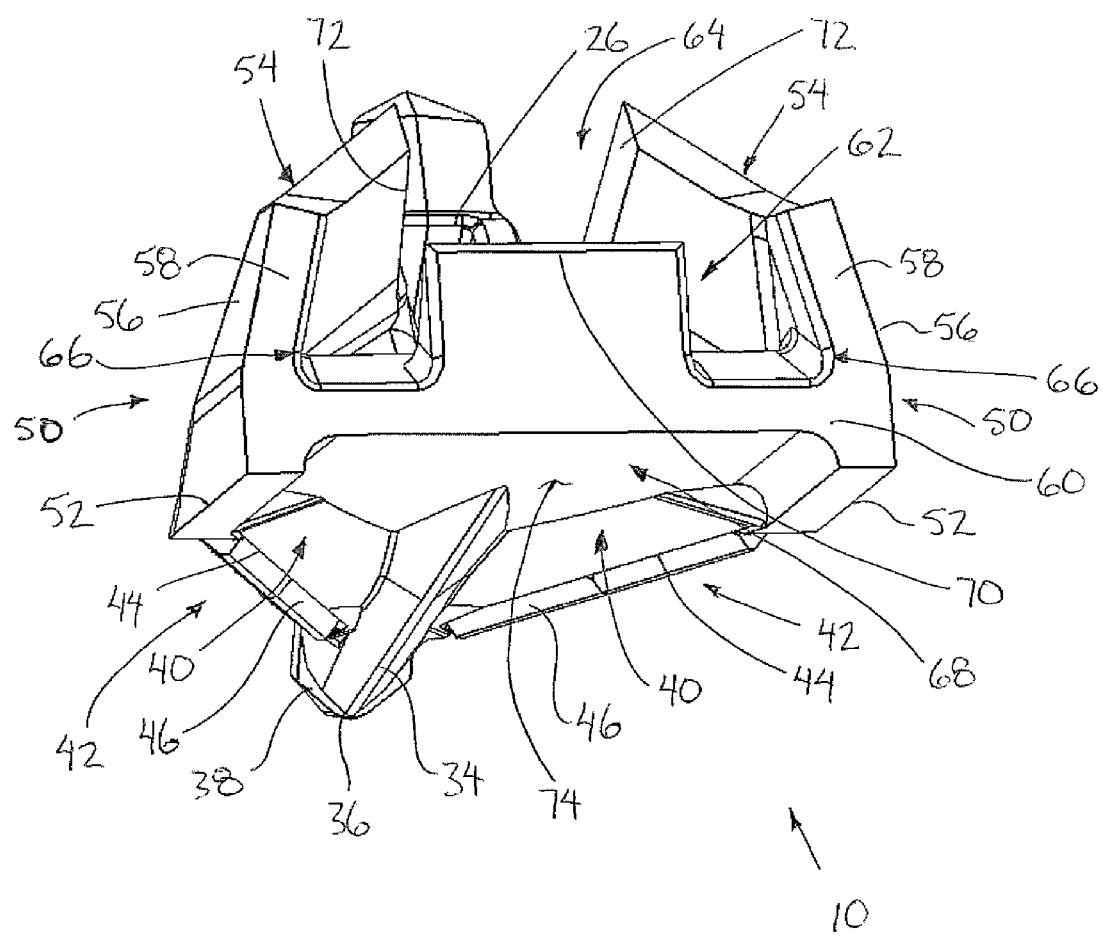
FIG. 5 is a bottom perspective view of the furrowing tip body.
Figure 6:
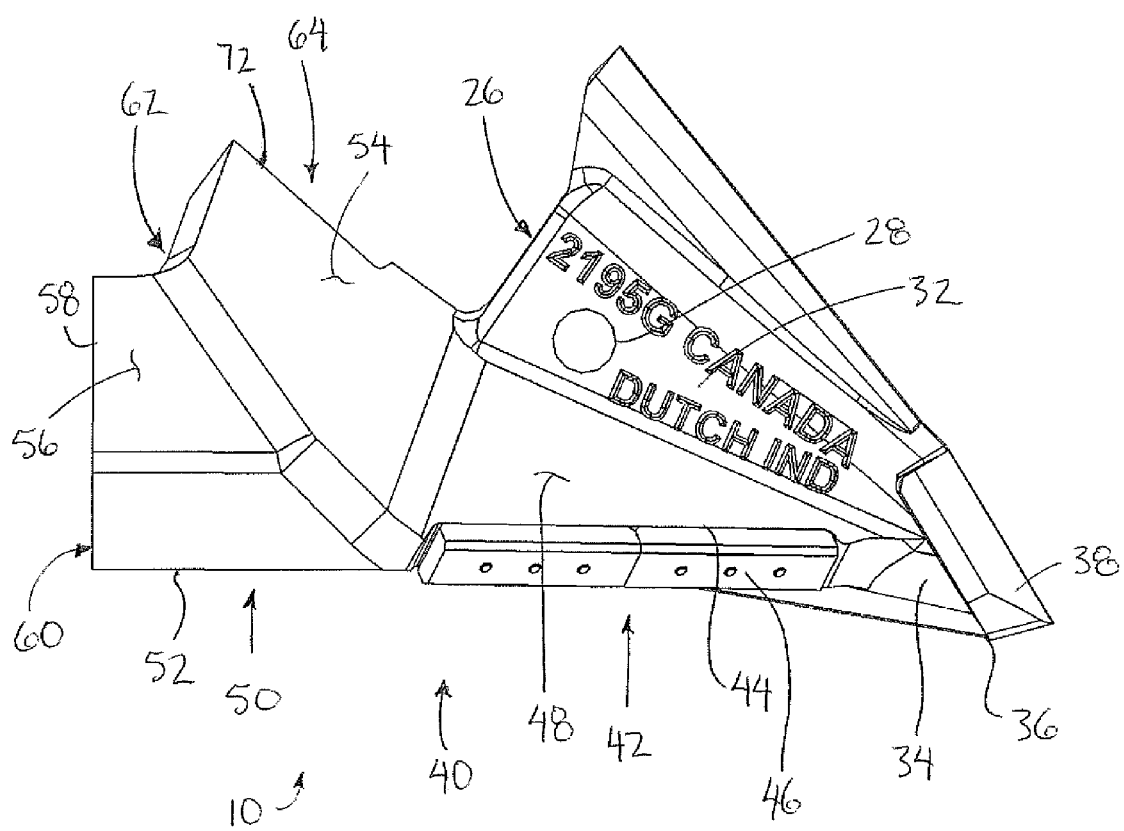
FIG. 6 is a side elevational view of the furrowing tip body.
Figure 7:
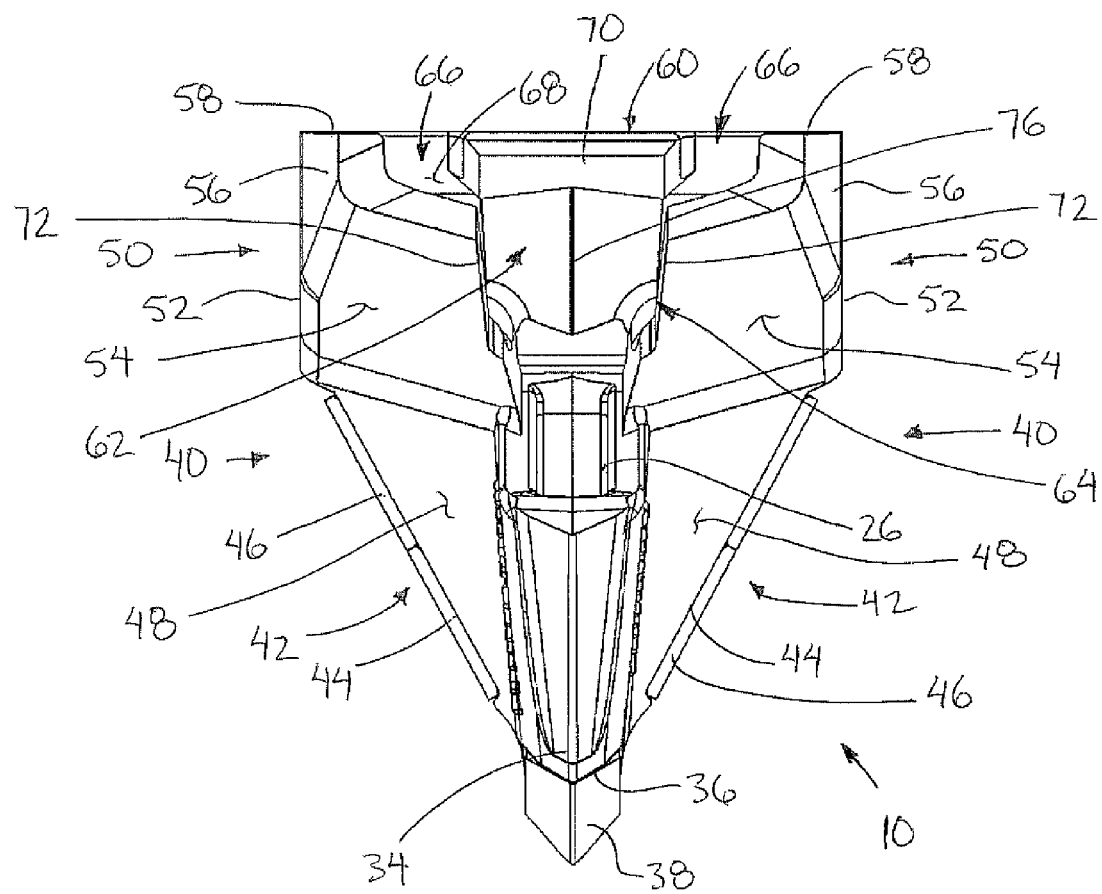
FIG. 7 is a top plan view of the furrowing tip body.
Figure 8:
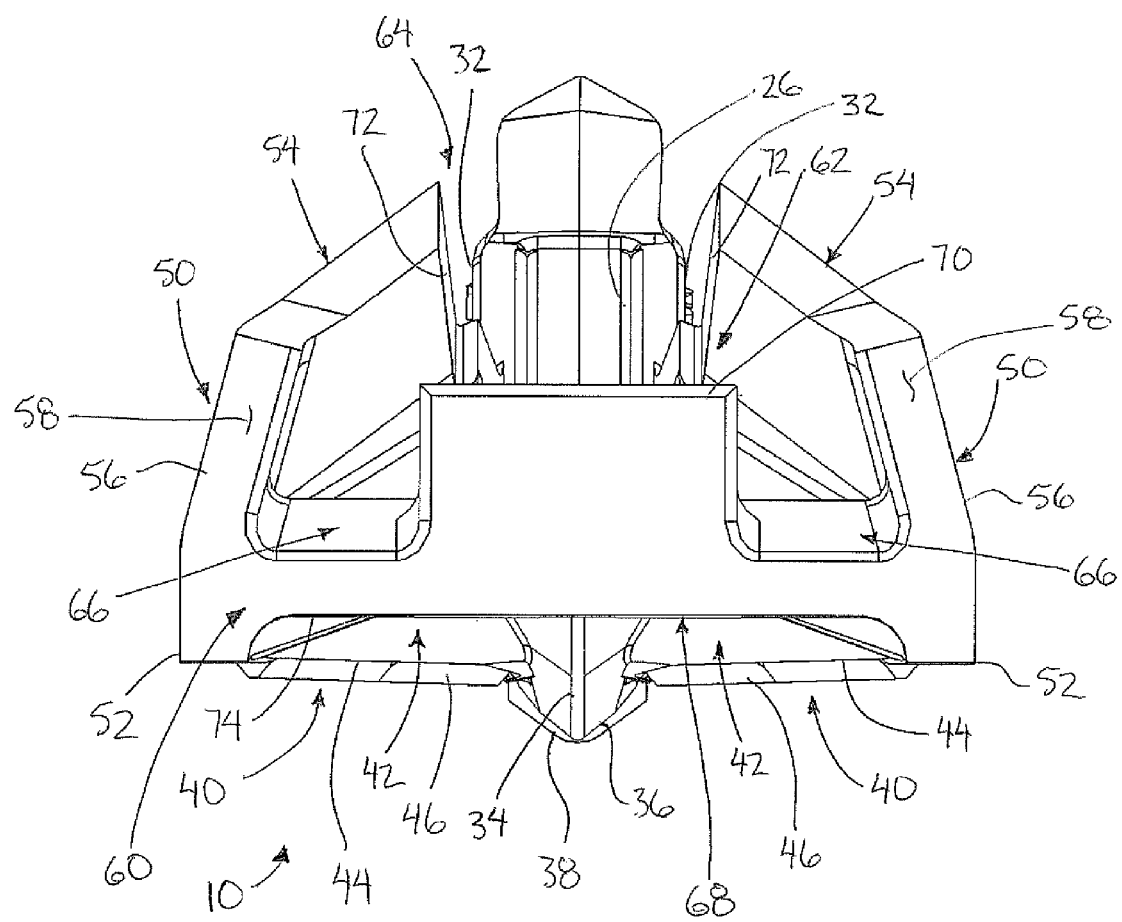
FIG. 8 is a rear elevational view of the furrowing tip body.

Referring to the accompanying figures there is illustrated a furrowing tip body generally indicated by reference numeral 10. The tip body 10 is arranged for use with a paired row opener 12 of the type which is suited for mounting on a implement shank 14 of an agricultural cultivator operated in a forward working direction in use.

The opener 12 comprises an opener body 16 including a shank mount 18 arranged for mounting onto the shank 14 using suitable fasteners. The opener also includes a primary delivery passage 20 and a secondary delivery passage 22 arranged for delivering respective materials therethrough, for example particulate seed or particulate fertilizer and the like.

In the illustrated embodiment the primary delivery passage 20 extends along a front side of the shank mount 18 to be located at the front of the opener body 16 while the secondary delivery passage 22 is arranged to be supported rearwardly of the shank mount for delivering the secondary material therethrough at a location spaced rearwardly of the implement shank. In further embodiments both delivery passages may be mounted ahead of the shank mount or rearwardly of the shank mount. In either instance the opener body 16 extends downwardly and forwardly to a bottom end supporting a lug 24 thereon which projects downwardly and forwardly for supporting the tip body 10 thereon.

The furrowing tip body 10 comprises a cast member forming a tip mount 26 therein in the form of a socket arranged to receive the lug 24 of the opener body therein. The socket defining the tip mount 26 and the lug 24 are arranged for close mating configuration with one another such that transverse mounting apertures 28 extending through the tip mount 26 and the lug 24 are arranged to align with one another in the mated position of the tip body on the opener body to receive a suitable mounting pin 30 which retains the tip body on the opener body. Removal of the pin 30 permits the tip body to be readily separated from the opener body.

The tip body is narrow between two generally parallel opposing side walls 32 extending along opposing sides of the tip mount 26 defined therebetween. The side walls 32 extend forwardly from the tip mount to define a knife portion 34 of similar width as the tip mount 26 which extends downwardly and forwardly to a bottom mating edge 36 of the knife portion which forms a lowermost portion of the tip body. The leading edge 36 includes a pointed carbide tip 38 secured thereon forming the leading edge of the knife portion. The bottom apex of the knife portion is aligned with the socket forming the tip mount 26 so that knife portion is aligned with the opener body and the implement shank upon which it is supported.

Two wing portions 40 are supported to extend generally rearwardly and laterally outwardly from opposing sides of the knife portion. Each wing portion includes a first forward portion 42 having a leading edge 44 which extends laterally outwardly and rearwardly from the side wall 32 of the knife portion from a location positioned upwardly and rearwardly from the leading edge of the knife portion. The leading edge 44 of each wing portion is near horizontal in orientation, locating a suitable carbide insert 46 along the edge thereof. The forward portion 42 of each wing portion also includes an upper surface 48 which extends generally upwardly and rearwardly from the leading edge 44 thereof to a rear edge joined with a respective second rearward portion 50 of the wing portion 40.

The second rearward portion 50 of each wing portion includes an outer edge 52 which extends rearward from a rear end of the leading edge 44 of the corresponding first forward portion such that the outer edge extends rearward substantially parallel to the other outer edge 52 and parallel to the forward working direction. The outer edge 52 further extends rearward along the bottom of the tip body in a near horizontal orientation to a rearmost end of the tip body 10.

The second rearward portion 50 of each wing portion also includes an upper surface 54 which extends rearwardly at an upward incline from the rear edge of the corresponding upper surface of the first forward portion 32 of the wing portion. The upper surface 44 of the second rearward portion 50 extends rearward at an upward incline which is more vertical than the upper and rearward incline of the first forward portion. The upper surface 54 extends to a rear edge which is adjacent the rearmost end of the tip body.

At an outer side 56 of each rearward portion 50 the upper surface 54 extends to an upright rear edge 58 of the wing portion which is near vertical in orientation at the rearmost end of the tip body so as to be generally in a common plane with a rear face 60 of the tip body.

The tip body also includes a central chamber 62 centrally located between the two wing portions 40 rearward of the tip mount 26. The central chamber 62 includes a top opening 64 which opens through the top end thereof for communication with the open bottom end of the primary delivery passage 20 of the opener body directly thereabove. The central chamber 62 is thus suitably arranged to receive a primary particulate material from the primary delivery passage 20 of the opener body. The central chamber 62 serves to split the material received therein into a pair of rows which are laterally spaced apart when dispensed through two outlet openings 66 located in the rear face 60 at the rearmost end of the tip body.

The central chamber 62 is arranged to be enclosed along the bottom side thereof by a bottom wall 68 which spans substantially a full bottom of the chamber between both the first and second portions of the wing portions 40 from the knife portion at the forward end of the tip body to the rear face 60 at the rearmost end of the tip body.

The central chamber is further enclosed along the rear side thereof by a rear wall 70 between the two outlet openings 66 which serves to define the lateral spacing between the outlet openings 66. The rear wall 70 extends vertically upward from the bottom wall 68 at the rearmost end of the tip body to define the rear face 60 in a common plane with the upright rear edges 58 of the wing portions 40.

A substantial portion of the top of the central chamber 62 is enclosed by the rearward portions 50 of the two wing portions 40 which extend upwardly and inwardly from the respective outer edge 52 to respective inner edges 72 of the wings which are arranged to be abutted against opposing sides of the opener body so that the only opening in the top side of the central chamber 62 is arranged to be occupied by the opener body and the primary delivery passage 20 extending therethrough in communication with the central chamber.

The two outlet openings 66 are arranged such that a plane of each opening is oriented in the vertical rear face at the rearmost end of the tip body generally perpendicular to the forward working direction and in a common plane with one another, with the upright rear edges of the wings and with the rear face 60. The upright rear edges of the wing portions and the upright edge of the rear wall 70 terminate at respective upper free edges arranged to abut the opener body when the tip body is mounted on the opener body such that the outlet openings 66 remain open through the top end of the tip body.

The top of the outlet openings 66 in the assembled position are thus defined by the opener body received between the wing portions and the rear wall 70. The inner edges of the two outlet openings 66 are defined by opposing edges of the rear wall 70 whereas the outer edges of the outlet openings are defined by the upright rear edges of the wings. The bottom wall 68 defines the bottom edge of the outlet openings. In the illustrated embodiment the height of the openings is near but slightly greater than a lateral width of each opening between opposing sides thereof.

The bottom wall 68 includes a substantially flat bottom side 74 which is near horizontal from the knife portion at the front of the tip body to the rear edge at the rearmost end of the tip body, as well as between the two opposing outer edges 52 of the wing portions. The leading edge of the knife portion and the leading edges of the two wing portions are arranged to project downwardly below the bottom side of the bottom wall.

An inner top side of the bottom wall 68 include a central ridge 76 formed thereon to extend in the longitudinal direction while being centered in the lateral direction between the outer edges 52 to define two opposing sloping surfaces which extend downwardly and outwardly from opposing sides of the central ridge 76 towards the two outlet openings 66 respectively. The central ridge 76 thus serves to split the seed received in the central chamber from the primary delivery passage 20 so that seed is deflected or diverted into two laterally spaced apart rows exiting from the two outlet openings 66 respectively.

The tip mount 26, the knife portion 34, the wing portions 40, the bottom wall 68 and the rear wall 70 are all cast together as an integral tip body which is selectively mounted on the lug 24 of the opener body and secured by a single mounting pin 30 such that removal of the mounting pin permits all of the components of the tip body to be readily separated from the opener body together for replacement as may be desired.

Once the tip body is attached on the opener body on an implement shank, fertilizer can be fed through the secondary delivery passage 22 to be deposited centrally behind the tip body for alignment with the deepest part of the furrower formed by the knife portion which projects downwardly below the wing portions. Seed deposited in the primary delivery passage 20 is communicated into the central chamber of the tip body where the seed is split on the central ridge to be deflected into a pair of rows deposited through the outlet openings 60 in the rear face of the tip body. The configuration of the bottom wall and the wing portions ensures that the central chamber is substantially fully enclosed about respective top, bottom and outer sides thereof so that the only openings in communication with the central chamber are the outlet openings in the rear face which are well protected from dirt being displaced by the formation of the furrow. In this manner, even in wet conditions, mud and debris is unlikely to enter the outlet openings so that plugging of the primary delivery passage 20, the central chamber 62 and the outlet openings 66 is thereby substantially prevented.

After extended use, the only components which typically suffer from any substantial wearing are the knife portion and the wing portions which can be readily replaced by removing a single fastener through the cooperating apertures of the tip mount and corresponding lug of the opener body respectively. A replacement tip body can then be mounted onto the lug of the opener body and a mounting pin inserted through the cooperating apertures once again for securement on the opener body.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A furrowing tip body arranged for use in a paired row opener, the paired row opener having an opener body comprising a shank mount arranged to support the opener body on an implement shank for movement therewith in a forward working direction and a primary delivery passage extending through the opener body so as to be arranged to deliver a primary particulate material therethrough, the furrowing tip body comprising:
   a tip mount arranged to support the tip body on the opener body of the paired row opener;
   a knife portion projecting forwardly from the tip mount to a forward end of the tip body;
   a pair of wing portions projecting rearwardly and laterally outwardly from opposing sides of the knife portion;
   a central chamber positioned rearwardly of the knife portion between the pair of wing portions and arranged to communicate with the primary delivery passage of the opener body to receive the primary particulate material therefrom;
   a bottom wall spanning a bottom side of the central chamber; and
   a pair of outlet openings at laterally spaced apart positions in a rear face of the tip body, the outlet openings being in communication with the central chamber so as to be arranged to dispense the primary particulate material from the central chamber into a pair of laterally spaced apart rows;
   the tip mount being readily separable from the opener body such that the knife portion, the wing portions, the bottom wall and the rear face locating the outlet openings therein are separable from the opener body together with one another.

2. The furrowing tip body according to claim 1 wherein the bottom wall extends rearwardly to a rear end of the tip body.

3. The furrowing tip body according to claim 1 wherein the bottom wall spans a full width of the tip body between the wing portions to the rear end of the tip body.

4. The furrowing tip body according to claim 1 wherein a plane of each of the outlet openings in the rear face of the tip body is in an upright orientation.

5. The furrowing tip body according to claim 1 wherein a plane of each of the outlet openings in the rear face of the tip body is in a vertical orientation.

6. The furrowing tip body according to claim 1 wherein a plane of the outlet openings in the rear face of the tip body are substantially coplanar with one another.

7. The furrowing tip body according to claim 1 wherein a plane of each of the outlet openings in the rear face of the tip body is substantially perpendicular to the forward working direction.

8. The furrowing tip body according to claim 1 wherein a top side of the central chamber is arranged to be substantially enclosed by the wing portions.

9. The furrowing tip body according to claim 1 wherein the wing portions extend rearward to the rear face of the tip body at the rear end of the tip body.

10. The furrowing tip body according to claim 1 wherein the wing portions each extend rearwardly to a respective upright rear edge lying substantially in a plane of the openings in the rear face of the tip body.

11. The furrowing tip body according to claim 10 wherein the upright rear edges of the wing portions are substantially vertical.

12. The furrowing tip body according to claim 1 wherein the knife portion extends downwardly below the bottom wall.

13. The furrowing tip body according to claim 1 wherein the wing portions extend downwardly below the bottom wall.

14. The furrowing tip body according to claim 1 wherein each wing portion has a first forward portion having a leading edge extending rearwardly at an outward incline and a second rearward portion having an outer edge extending rearwardly from the leading edge of the first forward portion, the bottom wall of the central chamber spanning between the outer edges of the pair of wing portions.

15. The furrowing tip body according to claim 14 wherein the outer edges of the second rearward portions of the wing portions are substantially parallel to one another.

16. The furrowing tip body according to claim 14 wherein the second rearward portions of the wing portions extend rearwardly to a rearmost end of the tip body.

17. The furrowing tip body according to claim 1 wherein each wing portion has a first forward portion having an upper surface extending rearwardly at an upward incline and a second rearward portion having an upper surface extending rearwardly from the upper surface of the first forward portion at an upward incline which is more vertical than the upper surface of the first forward portion.

18. The furrowing tip body according to claim 17 wherein the bottom wall of the central chamber spans between the second rearward portions of the pair of wing portions.

19. The furrowing tip body according to claim 17 wherein the second rearward portions of the wing portions extend rearwardly to a rearmost end of the tip body.

20. A furrowing tip body arranged for use in a paired row opener, the paired row opener having an opener body comprising a shank mount arranged to support the opener body on an implement shank for movement therewith in a forward working direction and a primary delivery passage extending through the opener body so as to be arranged to deliver a primary particulate material therethrough, the furrowing tip body comprising:
 a tip mount arranged to support the tip body on the opener body of the paired row opener;
 a knife portion projecting forwardly from the tip mount to a forward end of the tip body;
 a pair of wing portions projecting rearwardly and laterally outwardly from opposing sides of the knife portion to a rearmost end of the tip body;
 a central chamber positioned rearwardly of the knife portion between the pair of wing portions and arranged to communicate with the primary delivery passage of the opener body to receive the primary particulate material therefrom;
 a bottom wall spanning a bottom side of the central chamber across a full width of the tip body between the wing portions from the knife portion to the rearmost end of the tip body; and
 a pair of outlet openings at laterally spaced apart positions in a rear face at the rearmost end of the tip body wherein a plane of each opening is substantially vertical in orientation and substantially perpendicular to the forward working direction, the outlet openings being in communication with the central chamber so as to be arranged to dispense the primary particulate material from the central chamber into a pair of laterally spaced apart rows;
 the tip mount being readily separable from the opener body such that the knife portion, the wing portions, the bottom wall and the rear face locating the outlet openings therein are separable from the opener body together with one another.

\* \* \* \* \*